United States Patent [19]

Martins

[11] Patent Number: 5,507,529
[45] Date of Patent: Apr. 16, 1996

[54] RAPID COUPLING DEVICE FOR TUBE MEMBERS OF A HEAT EXCHANGER

[75] Inventor: Carlos Martins, Montfort La Maury, France

[73] Assignee: Valeo Climatisation, La Verriere, France

[21] Appl. No.: 343,626

[22] Filed: Nov. 22, 1994

[30] Foreign Application Priority Data

Nov. 29, 1993 [FR] France .................................. 93 14261

[51] Int. Cl.⁶ .......................... F16L 37/127; F16L 39/00
[52] U.S. Cl. ........................ 285/26; 285/137.1; 285/320
[58] Field of Search .............................. 285/26, 137.1, 285/320, 921; 165/176

[56] References Cited

U.S. PATENT DOCUMENTS

| 4,076,279 | 2/1978 | Klotz et al. ................... 285/26 |
|---|---|---|
| 4,116,476 | 9/1978 | Porter et al. |
| 4,753,268 | 6/1988 | Palau ............................ 285/137.1 |
| 4,900,065 | 2/1990 | Houck ........................... 285/137.1 |
| 5,180,005 | 1/1993 | Marsais et al. ............... 285/137.1 |
| 5,201,552 | 4/1993 | Hohmann et al. ............ 285/137.1 |
| 5,332,268 | 7/1994 | Godeau et al. ................. 285/26 |

FOREIGN PATENT DOCUMENTS

| 359657 | 3/1990 | European Pat. Off. ............. 285/26 |
|---|---|---|
| 0521776 | 7/1993 | European Pat. Off. |
| 571286 | 11/1993 | European Pat. Off. ............. 285/137.1 |
| 603033 | 6/1994 | European Pat. Off. ............. 285/26 |
| 2633368 | 12/1989 | France ................................ 285/26 |
| 9209060 | 3/1992 | Germany . |
| 222394 | 10/1924 | United Kingdom . |
| 2245946 | 4/1991 | United Kingdom . |

Primary Examiner—Eric K. Nicholson
Attorney, Agent, or Firm—Morgan & Finnegan

[57] ABSTRACT

A heat exchanger comprises a fluid inlet tube member and a fluid outlet tube member on parallel axes, and third and fourth tube members to be coupled end-to-end to the inlet and outlet tube members, for connection of the latter to external flexible tubes; and has a rapid coupling device which comprises two sleeves, constituting end portions of the third and fourth tube members, for embracing the fluid inlet and outlet tube members, which are provided with seals. A locking arm which is pivoted on one of the sleeves terminates a saddle which, in a locking position, extends through an aperture in the other sleeve so as to be engaged on the outlet tube member and to hold the latter in sealed contact with the second sleeve. The arm at the same time maintains the first sleeve in sealing contact with the inlet tube member, which is fixed with respect to the outlet tube member.

9 Claims, 2 Drawing Sheets

RAPID COUPLING DEVICE FOR TUBE MEMBERS OF A HEAT EXCHANGER

FIELD OF THE INVENTION

This invention relates to the end-to-end simultaneous connection of a first tube member and a second tube member, which are fixed with respect to each other and juxtaposed on parallel axes, respectively to a third tube member and a fourth tube member. Such a connection may serve in particular as part of a cooling circuit for the engine, or a heating circuit for the cabin, of a motor vehicle. In that case the first and second tube members are inlet and outlet tubes for heat transfer fluid of a heat exchanger, while the third and fourth tube members are connected to flexible tubes or pipes for carrying the heat transfer fluid between the heat exchanger and other elements of the circuit.

DISCUSSION OF THE INVENTION

It is desirable that this connection, which is carried out on vehicle assembly lines, shall be effected in a simple and rapid operation.

An object of the invention is to provide a rapid connecting device which satisfies this condition.

According to the invention, a rapid coupling device for the simultaneous end-to-end connection of a first tube member and a second tube member, which are fixed with respect to each other and juxtaposed on parallel axes, to a third tube member and a fourth tube member respectively, is characterised in that the device comprises a first sleeve and a second sleeve, the said sleeves defining parallel axes and being fixed with respect to each other in the axial direction and constituting end portions of the third and fourth tube members respectively, being adapted to fit over end portions of the first and second tube members respectively, the device further including sealing means for sealingly coupling the tube members when these are joined together, together with locking means for immobilising the sleeves with respect to the first and second tube members in a position in which the sealing means are effective, and in that the locking means comprise an arm which is mounted on the first sleeve in such a way as to be pivotable between a locking position, in which it penetrates through an aperture of the said second sleeve so as to come into engagement with the second sleeve, and an unlocking position in which it is out of contact with the second sleeve, immobilisation of the first sleeve with respect to the first tube member being obtained through the arm and the second tube member.

Some other preferred features, complementary to each other or alternative to each other, are as follows:

- the sealing means comprise annular sealing members compressed axially between the annular surfaces of the first and second tube members and internal shoulders of the sleeves.
- the arm engages on an external shoulder, directed rearwardly, of the second sleeve, whereby to urge the latter towards the internal shoulder of the second sleeve.
- the free end of the arm is in the form of a saddle which is open in the direction of its displacement towards the locking position, so that it partially surrounds the second tube member behind the shoulder of the latter.
- the free end of the arm has a finger which is adapted to lie in facing relationship with a rearwardly facing internal surface of the aperture in the second sleeve, so as to provide snap-fitting in the locking position, the finger being formed in axial projection on a lug which is resiliently deformable axially for release of the arm.
- the free end of the arm is divided by a longitudinal slot into the resiliently deformable lug and a second lug, the two lugs being adjacent, respectively, in the locking position, to two edges of the aperture which are opposed to each other in the axial direction.
- a finger, which is adapted to lie in facing relationship with that surface of the arm (10) which faces in the direction of its displacement towards the locking position, so as to provide snap-fitting in the locking position, is formed in axial projection on a lug which is fixed on the outside of the second sleeve to extend through an aperture of the arm, and which is resiliently deformable in the axial direction for release of the arm.
- the resiliently deformable lug and a second lug, separated from it by a longitudinal slot, are adjacent respectively, in the locking position, to two edges of the aperture of the arm which are mutually opposed in the axial direction.
- the two sleeves are joined together by flexible coupling means for permitting only a relative displacement at right angles to their axes.

The various features and advantages of the invention will appear more clearly on a reading of the detailed description, which follows, of preferred embodiments of the invention, being given by way of example only and with reference to the accompanying drawings.

DESCRIPTION OF PREFERRED EMBODIMENTS OF THE INVENTION

Figure 1:
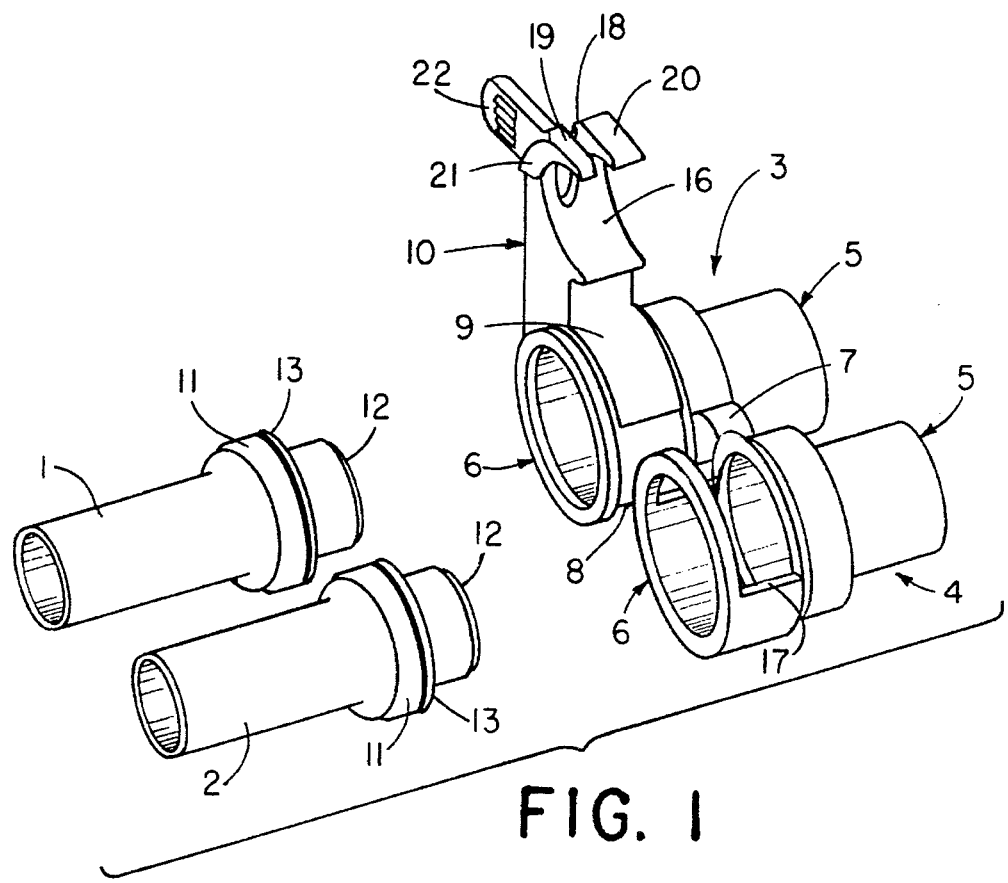
FIG. 1 is a perspective view of a device in accordance with the invention, before the sleeves have been fitted on the first and second tube members.

The device shown in FIGS. 1 to 5 is arranged to join together two rigid tube members 1 and 2 (referred to also as the first and second tube members respectively), which may for example be of metal or a suitable plastics material, and which constitute input and output branches or tube members of a heat exchanger, the remainder of which is not shown. The components to which these tube members are to be joined are flexible tubes which, again, are not shown in the drawings. The device comprises a third tube member 3 and a fourth tube member 4, which may for example be of a rigid plastics material. Each of these tube members 3, 4 has a portion 5 and a portion 6, the portion 6 being a sleeve of larger diameter than the portion 5. The members 3 and 4 will be referred to, for simplicity, as sleeves. The two sleeves 3 and 4 are joined together by means of a flexible coupling element 7, which maintains their axes parallel to each other and at a distance apart which is adjustable so as to correspond with the pitch between the axes of the tube members 1 and 2. The sleeves 3 and 4 and the coupling element 7 may be formed integrally with each other as a single component, for example by moulding; alternatively they may be separate pieces assembled together.

The portion 6 of larger diameter in the sleeve 3 has on its outer periphery a shallow annular groove 8 in which the arc-shaped base 9 of an attached arm 10 is accommodated. This enables the attached arm 10 to pivot about the axis of the sleeve 3. The base 9 surrounds the sleeve over slightly more than half the length of a circumference, in such a way that it can be introduced by elastic deformation, after which it retains itself in position. The axial length of the base 9 corresponds to that of the groove 8. In the present document, unless otherwise indicated, the term "axial" refers to the direction of the axes of the sleeves 3, 4 and/or axes of the tube members 1 and 2.

Each of the tube members 1 and 2 has an external annular rib 11 on the front face, that is to say that face which is directed towards the free end 12 of the tube member, on which there is arranged an annular sealing member 13 of the type having sealing lips.

When the sleeves 3 and 4 are fitted over the tube members 1 and 2 respectively, the free ends 12 of the latter penetrate into the larger diameter portions 6 of the sleeves, and then into the portions 5 having a smaller diameter, until the sealing members 13 come into engagement on the internal shoulders 13a which are defined between the portions 5 and 6 of the sleeves. The compression of the seals 13 between these shoulders and the ribs 11 gives sealed connection between the interior of the tube members 1 and 2 and the interior of the portions 5 of the sleeves, and therefore with the flexible tubes mounted on these latter, which may in particular be force-fitted on to them, and then retained by means of suitable collars or clips. Alternatively or in addition, they may be adhesively secured.

The arm 10 enables the sleeves to be locked on to the tube members 1 and 2 in this sealed position. In this connection, the arm 10 has, at that one of its ends which is opposed to the base 9, a portion 16 in the form of a saddle, having a semicylindrical surface defining an axis parallel to that of the sleeve 3, with a pitch equal to that of the tube members 1 and 2 and a diameter which is substantially equal to that of the tube member 2 behind the rib 11. Going from the open position shown in FIGS. 1 and 2, the arm 10 is able to pivot about the sleeve 3 in such a way that the saddle 16, the opening of which faces in the direction of this movement, approaches the sleeve 4 and penetrates into the latter through an aperture 17 which is formed in its portion 6 having the larger diameter. The saddle 16 then embraces the tube member 2 behind the rib 11.

The free end of the arm 10, which defines the outer branch of the saddle 16, is divided, by a slot 18 which is orientated at right angles to the axes of the sleeves, into two lugs 19 and 20 which lie, respectively, on the rear side (i.e. towards the heat exchanger) and on the front side (i.e. towards the flexible tubes) of the slot.

The lug 19 has a finger 21 on the front face of the arm. During the closing movement of the arm, this front face slides along the front edge of the aperture 17. The finger 21, the rear face of which is inclined and forms a ramp, disappears due to the flexibility of the lug 19. When the finger has reached the interior of the sleeve, the lug reverts elastically to its previous position, and the finger 21 is retained against the internal face of the sleeve, preventing the arm from being opened again. This result can be achieved by causing the lug 19 to flex, by operation of a tongue 22 which is fixed to the latter and which projects outside the sleeve.

In the locking position, the saddle 16 is gripped axially between the shoulder 11 of the tube member 2 and the rear edge of the aperture 17 of the sleeve 4, thus ensuring a rigid coupling between the sleeve, the tube member and the arm 10. The tube member 1 and the sleeve 3 are connected rigidly to the tube member 2, through the heat exchanger, and to the arm 10 respectively. They are thus themselves also held in sealing contact by means of the sealing member 13 of the tube member 1. An adjustment of the ends 12 of the tube members 1 and 2 in the portions 5 of the sleeves can also contribute to the rigid coupling together of the component parts of the assembly.

Figure 2:
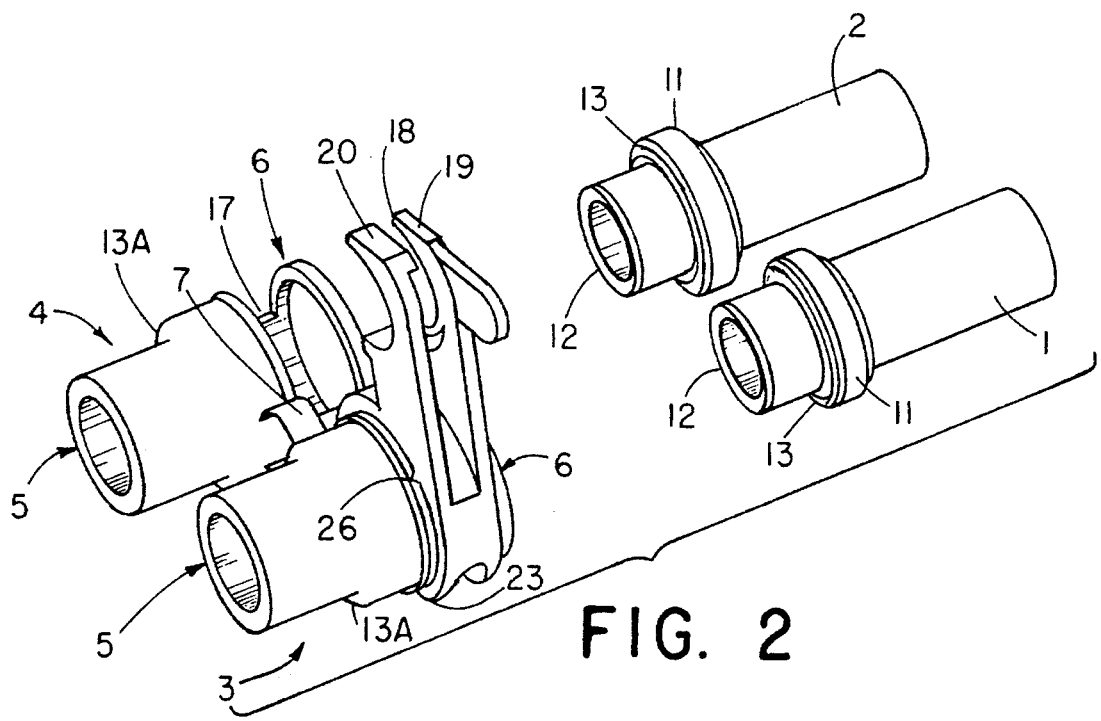
FIG. 2 is a view of the same, but from a different angle.
Figures 3, 4, 5, 6:
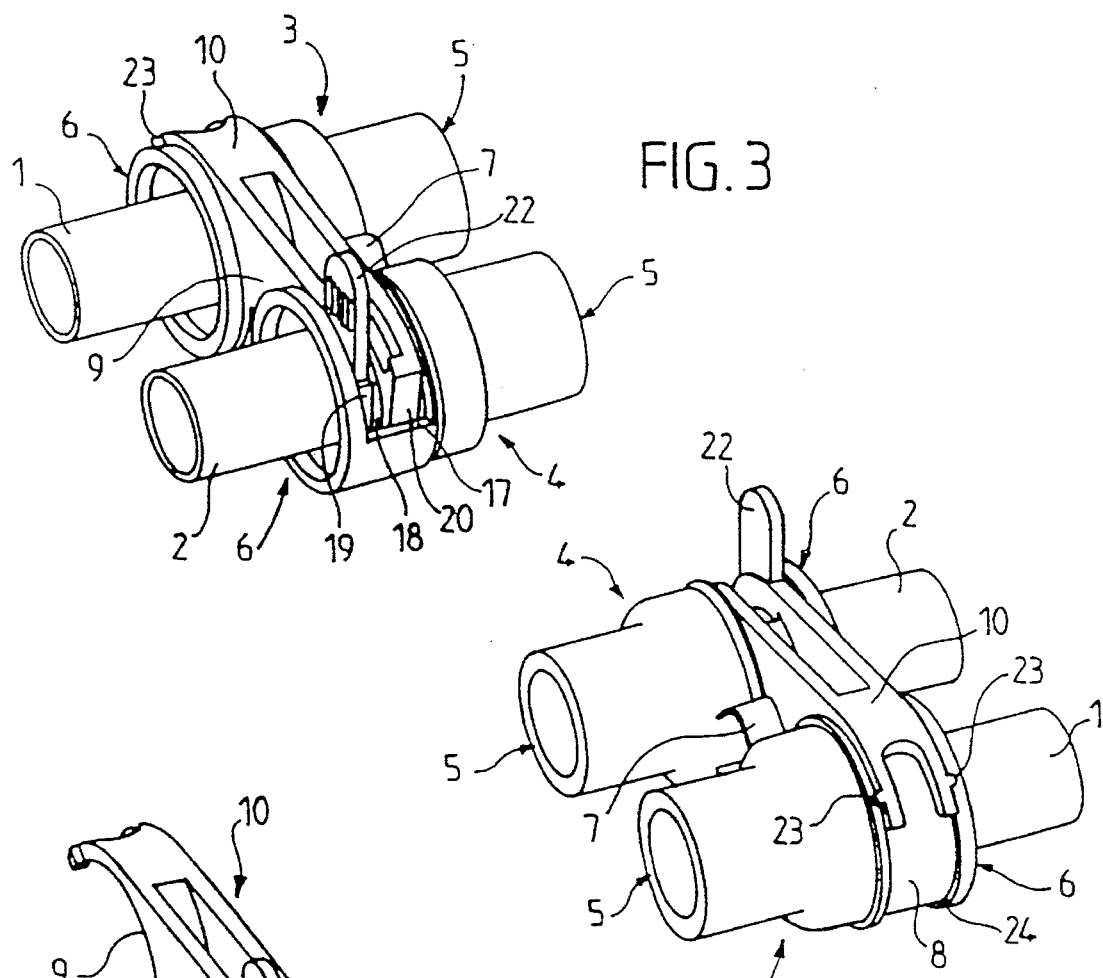
FIG. 3 is a view similar to FIG. 1 showing the device assembled and locked together.
FIG. 4 is a view similar to FIG. 2 showing the device assembled and locked together.
FIG. 5 is a view similar to FIG. 1 showing the locking arm separately.
FIG. 6 is a perspective view, similar to FIG. 1 but showing only the sleeves, in a modified embodiment of the invention.

In order to prevent any premature pivoting action of the arm 10 from the unlocked position shown in FIGS. 1 and 2, the arm 10 is provided with projections 23 which cooperate with notches 24, one of which can be seen in FIG. 4. These notches 24 are formed in the edges of the groove 8. The projections 23 are accommodated in notches 26 in the locked position.

In the modified embodiment shown in FIG. 6, in which the same reference numerals as in FIGS. 1 to 5 are used in order to designate elements similar or identical to those in FIGS. 1 to 5, only this sleeve 4 and the lever 10 are modified from the previous embodiment. The slot 18, the finger 21 and the tongue 22 are omitted here, and a slot 18a is arranged in the back part of the saddle 16.

The sleeve 4 has two resiliently flexible lugs 19a and 19b which project outwardly from the aperture 17, and which are separated by a slot 18b. The lugs 19a and 19b terminate respectively in manoeuvring tongues 22a and 22b. Fingers 21a and 21b are formed on the rear edge of the rear lug 19a, and on the front edge of the front lug 19b, respectively. During the closing movement of the arm, the tongues 22a and 22b first penetrate into the slot 18a, and the rear and front edges of the latter then come into engagement on the inclined faces of the fingers 21a and 21b, causing the latter to disappear by elastic bending of the lugs. These lugs resume their position when the fingers have passed through the slot 18a, so that they then maintain the arm in its locked position.

Release of the arm can be obtained by deflecting one of the tongues 22a towards the other one 22b or vice versa, thus once again causing the fingers to be resiliently effaced.

What is claimed is:

1. An assembly comprising a first tube member, a second tube member with said first and second tube members each defining respective axes parallel to each other, a third tube member engaging the first tube member endwise, and a fourth tube member engaging the second tube member endwise, the assembly further including a rapid coupling device for simultaneously joining said first and second tube members endwise to said third and fourth tube members respectively, wherein the coupling device has a first sleeve and a second sleeve, defining respective axes parallel to each other and fixed with respect to each other in the axial direction, said sleeves constituting respective end portions of said third and fourth tube members, for fitting around end portions of said first and second tube members respectively, the assembly further including sealing means for providing sealing between said endwise engaged tube members, and locking means for immobilizing said sleeves axially with respect to said first and second tube members in a position in which said sealing means are effective, said locking means having an arm mounted on said first sleeve for pivoting movement in a plane that is generally transverse to said tube member axes between a locking position and an unlocking position, said second sleeve being formed with an aperture for receiving the arm in said locking position, said arm disengaging said second tube member in the unlocking position, whereby said first sleeve is immobilized with respect to said first tube member through said arm and said second tube member.

2. An assembly according to claim 1, wherein said first and second tube members have annular surfaces and said sleeves have corresponding internal shoulders, said sealing means comprising annular sealing members compressed axially between said annular surfaces and said internal shoulders.

3. An assembly according to claim 2, wherein said second tube member has an external shoulder, said arm being in engagement on said shoulder urging said second tube member towards said second sleeve internal shoulder.

4. An assembly comprising a first tube member, a second tube member having a shoulder with said first and second tube members each defining respective axes parallel to each other, a third tube member engaging the first tube member endwise, and a fourth tube member engaging the second tube member endwise, the assembly further including a rapid coupling device for simultaneously joining said first and second tube members endwise to said third and fourth tube members respectively, wherein the coupling device has a first sleeve and a second sleeve, defining respective axes parallel to each other and fixed with respect to each other in the axial direction, said sleeves constituting respective end portions of said third and fourth tube members, for fitting around end portions of said first and second tube members respectively, the assembly further including sealing means for providing sealing between said endwise engaged tube members, and locking means for immobilizing said sleeves axially with respect to said first and second tube members in a position in which said sealing means are effective, said locking means having an arm mounted on said first sleeve for pivoting movement between a locking position and an unlocking position, said second sleeve being formed with an aperture for receiving the arm in said locking position, said arm disengaging said second tube member in the unlocking position, whereby said first sleeve is immobilized with respect to said first tube member through said arm and said second tube member, wherein said arm has a free end portion in the form of a saddle open in the direction of its displacement from said unlocking position to said locking position, whereby in said locking position said arm partially surrounds said second tube member behind said second tube member shoulder.

5. An assembly comprising a first tube member, a second tube member with said first and second tube members each defining respective axes parallel to each other, a third tube member engaging the first tube member endwise, and a fourth tube member engaging the second tube member endwise, the assembly further including a rapid coupling device for simultaneously joining said first and second tube members endwise to said third and fourth tube members respectively, wherein the coupling device has a first sleeve and a second sleeve, defining respective axes parallel to each other and fixed with respect to each other in the axial direction, said sleeves constituting respective end portions of said third and fourth tube members, for fitting around end portions of said first and second tube members respectively, the assembly further including sealing means for providing sealing between said endwise engaged tube members, and locking means for immobilizing said sleeves axially with respect to said first and second tube members in a position in which said sealing means are effective, said locking means having an arm mounted on said first sleeve for pivoting movement between a locking position and an unlocking position, said second sleeve being formed with an aperture for receiving the arm in said locking position, said arm disengaging said second tube member in the unlocking position, whereby said first sleeve is immobilized with respect to said first tube member through said arm and said second tube member, wherein said arm receiving aperture in said second sleeve has an internal surface, said arm having a free end defining a finger in facing relationship with an internal surface of said aperture in said second sleeve, wherein said finger establishes a snap-fitting for said arm in the locking position, said arm having a lug which is elastically deformable in the axial direction to release said arm, said finger being formed in axial projection on said lug.

6. An assembly according to claim 5, wherein said arm has a free end with a longitudinal slot defining on either side thereof said elastically deformable lug and a second lug, said aperture having two edges opposed to each other in the axial direction, said two lugs being adjacent respectively to the two opposed edges in the locking position.

7. An assembly comprising a first tube member, a second tube member with said first and second tube members each defining respective axes parallel to each other, a third tube member engaging the first tube member endwise, and a fourth tube member engaging the second tube member endwise, the assembly further including a rapid coupling device for simultaneously joining said first and second tube members endwise to said third and fourth tube members respectively, wherein the coupling device has a first sleeve and a second sleeve, defining respective axes parallel to each other and fixed with respect to each other in the axial direction, said sleeves constituting respective end portions of said third and fourth tube members, for fitting around end portions of said first and second tube members respectively, the assembly further including sealing means for providing sealing between said endwise engaged tube members, and locking means for immobilizing said sleeves axially with respect to said first and second tube members in a position in which said sealing means are effective, said locking means having an arm mounted on said first sleeve for pivoting movement between a locking position and an unlocking position, said second sleeve being formed with an aperture for receiving the arm in said locking position, said arm disengaging said second tube member in the unlocking position, whereby said first sleeve is immobilized with respect to said first tube member through said arm and said second tube member, including a lug fixed externally to said second sleeve, said arm having an aperture through which said lug extends, and a finger formed on said lug, said finger being in facing relationship with a surface of said arm directed in the direction of displacement of said arm from said locking position to said unlocking position, whereby said finger provides snap-fitting engagement in said locking position, said lug being elastically deformable in an axial direction for release of said arm.

8. An assembly according to claim 7, wherein said arm defines an aperture having two edges opposed to each other in the axial direction, said coupling device further comprising a second lug defining a longitudinal slot separating said second lug from said elastically deformable lug, said two lugs being respectively adjacent, in said locking position, to said two aperture edges in said arm.

9. An assembly comprising a first tube member, a second tube member with said first and second tube members each defining respective axes parallel to each other, a third tube member engaging the first tube member endwise, and a fourth tube member engaging the second tube member endwise, the assembly further including a rapid coupling device for simultaneously joining said first and second tube members endwise to said third and fourth tube members respectively, wherein the coupling device has a first sleeve and a second sleeve, defining respective axes parallel to each other and fixed with respect to each other in the axial direction, said sleeves constituting respective end portions of said third and fourth tube members, for fitting around end portions of said first and second tube members respectively, the assembly further including sealing means for providing sealing between said endwise engaged tube members, and locking means for immobilizing said sleeves axially with respect to said first and second tube members in a position in which said sealing means are effective, said locking means having an arm mounted on said first sleeve for pivoting movement between a locking position and an unlocking position, said second sleeve being formed with an aperture for receiving the arm in said locking position, said arm disengaging said second tube member in the unlocking position, whereby said first sleeve is immobilized with respect to said first tube member through said arm and said second tube member, further including flexible coupling means joining said two sleeves together whereby to permit only relative displacement of said sleeves at right angles to their axes.

* * * * *